(12) United States Patent
Myerchin

(10) Patent No.: US 8,576,553 B2
(45) Date of Patent: Nov. 5, 2013

(54) BASE WITH COUNTERWEIGHT FOR DISPLAY SCREENS

(75) Inventor: Christian P. Myerchin, Bellevue, WA (US)

(73) Assignee: Myerchin Enterprises, Inc., Bellevue, WA (US)

(*) Notice: Subject to any disclaimer, the term of this patent is extended or adjusted under 35 U.S.C. 154(b) by 241 days.

(21) Appl. No.: 13/109,861

(22) Filed: May 17, 2011

(65) Prior Publication Data
US 2012/0293941 A1    Nov. 22, 2012

(51) Int. Cl.
*G06F 1/16*    (2006.01)
*F16M 11/10*   (2006.01)
*F16M 11/38*   (2006.01)
*B23P 11/00*   (2006.01)

(52) U.S. Cl.
USPC ............... 361/679.22; 248/158; 248/123.2; 29/428

(58) Field of Classification Search
USPC ............ 361/679.22; 248/123.2, 158; 29/428
See application file for complete search history.

(56) References Cited

U.S. PATENT DOCUMENTS

| | | |
|---|---|---|
| 213,775 A | 4/1879 | Redman et al. |
| 806,790 A | 12/1905 | Foersterling et al. |
| 1,120,485 A | 12/1914 | Heinke |
| 1,189,754 A | 7/1916 | Trenaman |
| 1,515,242 A | 11/1924 | Dexter |
| 1,658,771 A | 2/1928 | Nelson |
| 1,765,168 A | 6/1930 | Laursen |
| 1,937,386 A | 11/1933 | Howe |
| 2,181,272 A | 11/1939 | Greenleaf |
| 2,308,496 A | 1/1943 | Dieffenbach |
| 2,414,684 A | 1/1947 | Wohlforth |
| 2,441,037 A | 5/1948 | Sherrin |
| 2,506,852 A | 5/1950 | Barcus |
| 2,636,549 A | 4/1953 | Geller |
| 2,648,146 A * | 8/1953 | Foster ............................. 38/30 |
| 2,834,568 A * | 5/1958 | Foster ........................... 248/593 |
| 2,872,178 A | 2/1959 | Holland |
| 2,924,443 A | 2/1960 | Townsend et al. |
| 3,097,712 A | 7/1963 | Johnson |
| 3,253,473 A | 5/1966 | Chisholm et al. |
| 3,333,912 A | 8/1967 | Kunz et al. |
| 3,820,752 A * | 6/1974 | Oram ......................... 248/284.1 |

(Continued)

FOREIGN PATENT DOCUMENTS

| | | |
|---|---|---|
| JP | 2006-148504 A | 6/2006 |
| JP | 2008-083106 A | 4/2008 |

OTHER PUBLICATIONS

Ulanoff, L., "How Far Will Apple Go With Touch?" PCMag.com, Jun. 7, 2011, 2 pages http://www.pcmag.com/article2/0,2817,2386548,00.asp accessed Sep. 6, 2011.

(Continued)

*Primary Examiner* — Tuan T Dinh
*Assistant Examiner* — Mukund G Patel
(74) *Attorney, Agent, or Firm* — Frommer Lawrence & Haug LLP; Jamie L. Wiegand

(57) ABSTRACT

Embodiments are directed towards a support structure for electronic displays with a counterweight that is directed towards maintaining a center of gravity for the support structure, display, and counterweight over the support structure. Embodiments further disclose mechanisms for indirectly coupling the display and providing for counterweight rotations.

8 Claims, 7 Drawing Sheets

(56) References Cited

U.S. PATENT DOCUMENTS

| | | | |
|---|---|---|---|
| 3,981,340 A | 9/1976 | Anderson et al. | |
| 4,100,858 A | 7/1978 | Bue et al. | |
| 4,165,530 A | 8/1979 | Sowden | |
| 4,383,486 A | 5/1983 | Reineman et al. | |
| 4,568,052 A | 2/1986 | Solomon et al. | |
| 4,571,775 A | 2/1986 | Leonard | |
| 4,602,855 A | 7/1986 | Frey | |
| 4,756,054 A | 7/1988 | Mitts et al. | |
| 4,848,244 A | 7/1989 | Bennett | |
| 4,953,256 A | 9/1990 | Salmela et al. | |
| 5,253,832 A | 10/1993 | Bolas et al. | |
| 5,501,420 A | 3/1996 | Watt et al. | |
| 5,609,316 A | 3/1997 | Tigliev | |
| 5,681,079 A | 10/1997 | Robinson | |
| 5,779,209 A * | 7/1998 | Rello | 248/278.1 |
| 5,819,670 A | 10/1998 | O'Connor et al. | |
| 5,855,344 A | 1/1999 | Rogers | |
| 5,876,008 A | 3/1999 | Sweere et al. | |
| 5,918,841 A | 7/1999 | Sweere et al. | |
| 6,057,810 A | 5/2000 | Roell et al. | |
| 6,163,451 A | 12/2000 | Chiu | |
| 6,288,891 B1 | 9/2001 | Hasegawa et al. | |
| 6,378,829 B1 | 4/2002 | Sträter et al. | |
| 6,382,577 B1 | 5/2002 | McCoy et al. | |
| 6,433,761 B1 | 8/2002 | Remitz | |
| 6,441,323 B1 | 8/2002 | Montagnino et al. | |
| 6,484,993 B2 | 11/2002 | Huffman | |
| 6,663,064 B1 | 12/2003 | Minelli et al. | |
| 6,672,553 B1 | 1/2004 | Lin | |
| 7,032,425 B1 | 4/2006 | Esh | |
| 7,061,753 B2 | 6/2006 | Michoux et al. | |
| 7,252,277 B2 | 8/2007 | Sweere et al. | |
| 7,289,315 B2 * | 10/2007 | Hillman et al. | 361/679.55 |
| 7,421,812 B2 | 9/2008 | Liou et al. | |
| 7,421,813 B2 | 9/2008 | Liou et al. | |
| 7,445,187 B2 | 11/2008 | Shin | |
| 7,494,104 B2 | 2/2009 | Baek | |
| 7,584,933 B2 | 9/2009 | Chih | |
| 7,630,193 B2 | 12/2009 | Ledbetter et al. | |
| 7,637,463 B2 | 12/2009 | Yen et al. | |
| 7,651,058 B2 | 1/2010 | Cho et al. | |
| 7,690,605 B2 | 4/2010 | Lee et al. | |
| 7,717,384 B2 | 5/2010 | Kim | |
| 7,726,616 B2 | 6/2010 | Zhang et al. | |
| 7,810,773 B2 | 10/2010 | Chi | |
| 7,828,252 B2 | 11/2010 | Parsons | |
| 2003/0214480 A1 | 11/2003 | Chng | |
| 2005/0023424 A1 * | 2/2005 | Chow et al. | 248/292.11 |
| 2006/0091274 A1 | 5/2006 | Asamarai et al. | |
| 2006/0231711 A1 | 10/2006 | Shin | |
| 2006/0255216 A1 | 11/2006 | Cho et al. | |
| 2007/0001076 A1 | 1/2007 | Asamarai et al. | |
| 2007/0007412 A1 | 1/2007 | Wang | |
| 2007/0194182 A1 | 8/2007 | Lee | |
| 2009/0173845 A1 | 7/2009 | Wang et al. | |
| 2010/0001148 A1 | 1/2010 | Mesfin et al. | |
| 2010/0250152 A1 | 9/2010 | Farrow | |

OTHER PUBLICATIONS

Boxall, A., "Maybe I Don't Want a Touchscreen Laptop," www.digitaltrends.com, Nov. 1, 2012.
Davis, C., "Will Touchscreen Technology Eliminate Ergonomic Risk in Computing and Gaming?" The ERGOLAB, Apr. 20, 2010.
Pogue, D., "Why Touch Screens Will Not Take Over," Scientific American, Jan. 3, 2013.
Tessler, F., "The Hidden Danger of Touchscreens," InfoWorld.com, Jan. 11, 2012.
International Search Report and Written Opinion for International Patent Application No. PCT/US2012/038195 mailed Dec. 27, 2012.
International Search Report and Written Opinion for International Patent Application No. PCT/US2012/038207 mailed Dec. 26, 2012.
Official Communication for U.S. Appl. No. 13/188,788 mailed Mar. 4, 2013.

* cited by examiner

BASE WITH COUNTERWEIGHT FOR DISPLAY SCREENS

TECHNICAL FIELD

Various embodiments, relate generally to computer display mounting devices, and more particularly, but not exclusively to a mounting base having a counterweight useable for displays, such as touch screen displays, where the counterweight is directed towards maintaining a center of mass over the mounting base at least during rotation of the display about the base.

BACKGROUND

Electronic displays with data input capability may be considered as having two distinct usage modes. One usage mode is for information display, while a second usage mode is where a touch screen interaction and display are provided simultaneously. In the first usage mode, the typical computer display involves a standard computer monitor, with an ergonomic design that encourages the display to be at a typical arm's length away from a user and at, or slightly below eye level. However, this position may not be ideal for the second usage mode where touching the screen is intended as a primary method of input. For the second usage mode, the display is often placed closer to the user, lower and in a more horizontal position than in a typical first usage mode. This can be accomplished by placing the display at the end of an arm and pivoting the arm from an elevated position to a lower position. However when this is done, it often moves the center of mass for the combined display and base to a point where the combination of base and display can topple. Thus, it is with respect to these considerations, and others, that embodiments of the present invention have been made.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding, reference will be made to the following Detailed Description, which is to be read in association with the accompanying drawings, wherein.

DETAILED DESCRIPTION

Figure 1A:
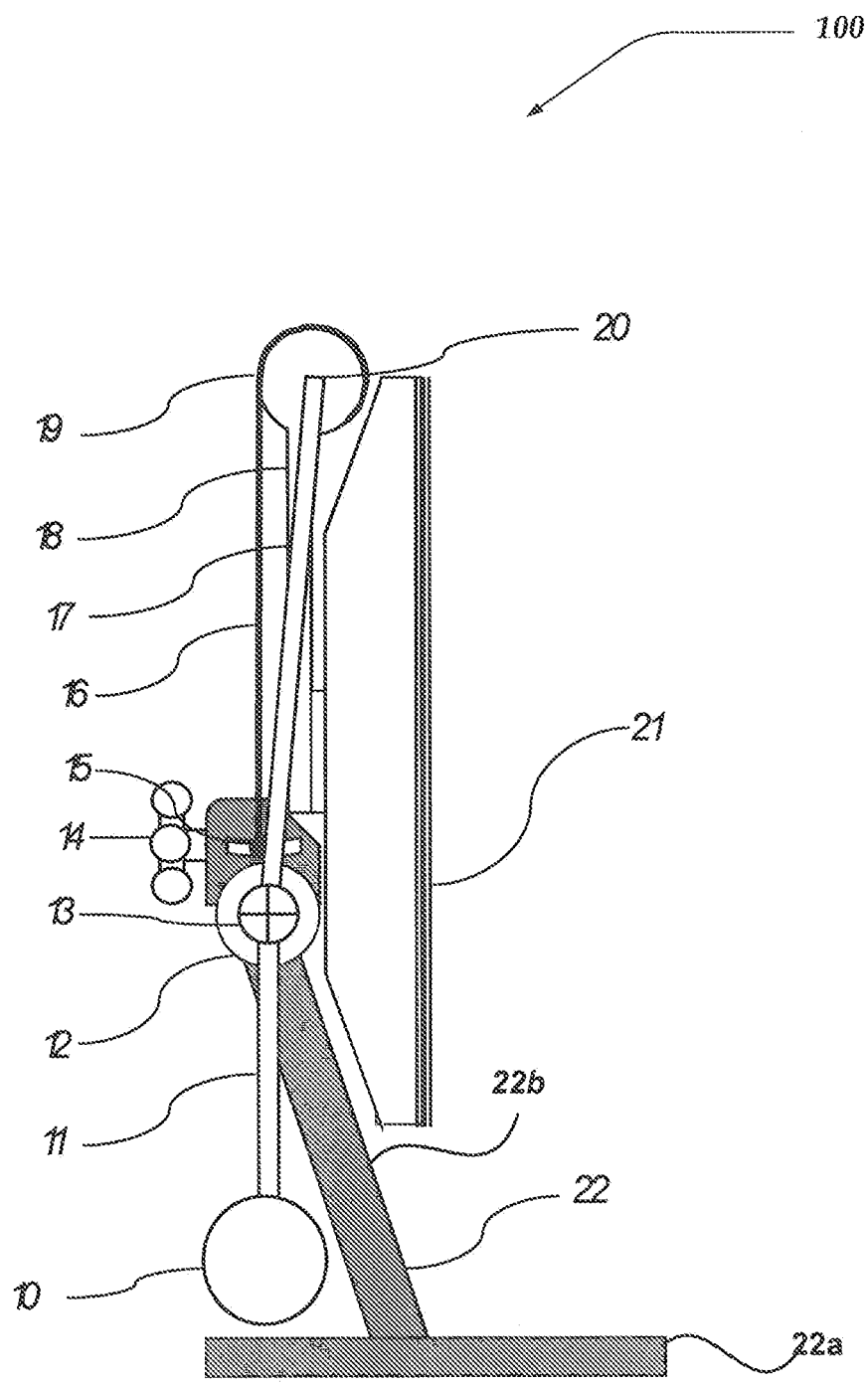
FIGS. 1A-1C illustrate perspective views of one embodiment of a base having a counterweight with a computer display in various angled positions.

Embodiments now will be described more fully hereinafter with reference to the accompanying drawings, which form a part hereof, and which show, by way of illustration, specific embodiments which may be practiced. This invention may, however, be embodied in many different forms and should not be construed as limited to the embodiments set forth herein; rather, these embodiments are provided so that this disclosure will be thorough and complete, and will fully convey the scope to those skilled in the art. The following detailed description is, therefore, not to be taken in a limiting sense.

Throughout the specification and claims, the following terms take the meanings explicitly associated herein, unless the context clearly dictates otherwise. References to "one embodiment," "an embodiment," "another embodiment," as used herein indicates that a particular feature, structure, or characteristic described in connection with the embodiment is included in at least one embodiment. However, the phrase "in one embodiment" as used, herein does not necessarily refer to the same embodiment, though it may. Furthermore, the phrase "in another embodiment" as used herein does not necessarily refer to a different embodiment, although it may. Thus, as described below, various embodiments may be readily combined.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

The following briefly describes the various embodiments in order to provide a basic understanding of some aspects of the invention. This brief description is not, intended as an extensive overview. It is not intended to identify key or critical elements, or to delineate or otherwise narrow the scope. Its purpose is merely to, present some concepts in a simplified form as a prelude to the more detailed description that is presented later.

Briefly stated embodiments are directed towards a mounting base for a computer display device, the mounting base having a counterweight configured to maintain a center of mass of the base assembly with the display device to minimize a likelihood of toppling when the display device is pivoted outward about the base. In at least one embodiment, the counterweight is indirectly coupled with the display device using a plurality of coupled arms, rather than a single boom arm structure.

In one embodiment, a computer display is attached to a display mount that is pivotally connected to at least one display arm. In one embodiment, the display mount comprises a display mount arm. The display arm(s) are pivotally connected to a mounting base. One or more counterweight(s) are attached to one or more counterweight arm(s), where the display and counterweight arms are pivotally connected to the base. The display arm(s) and counterweight arm(s) are coupled in such a way as to maintain the center of mass for the whole assembly (combined base, arms, and display) over the base.

As disclosed further below, an apparatus is disclosed for maintaining a center of mass of the structure, including a display device, over a base when the display device is rotated by employing, in part, matched non-linear counter forces on the rotating display device. Such arrangement is directed towards providing a simplistic design for ease of manufacture and reliability of at least the apparatus. Other advantages of one or more aspects will be apparent from consideration of the drawings and ensuing description.

PARTIAL LIST OF REFERENCE NUMERALS

10—Counterweight
11—Counterweight Arm

Figure 1B:
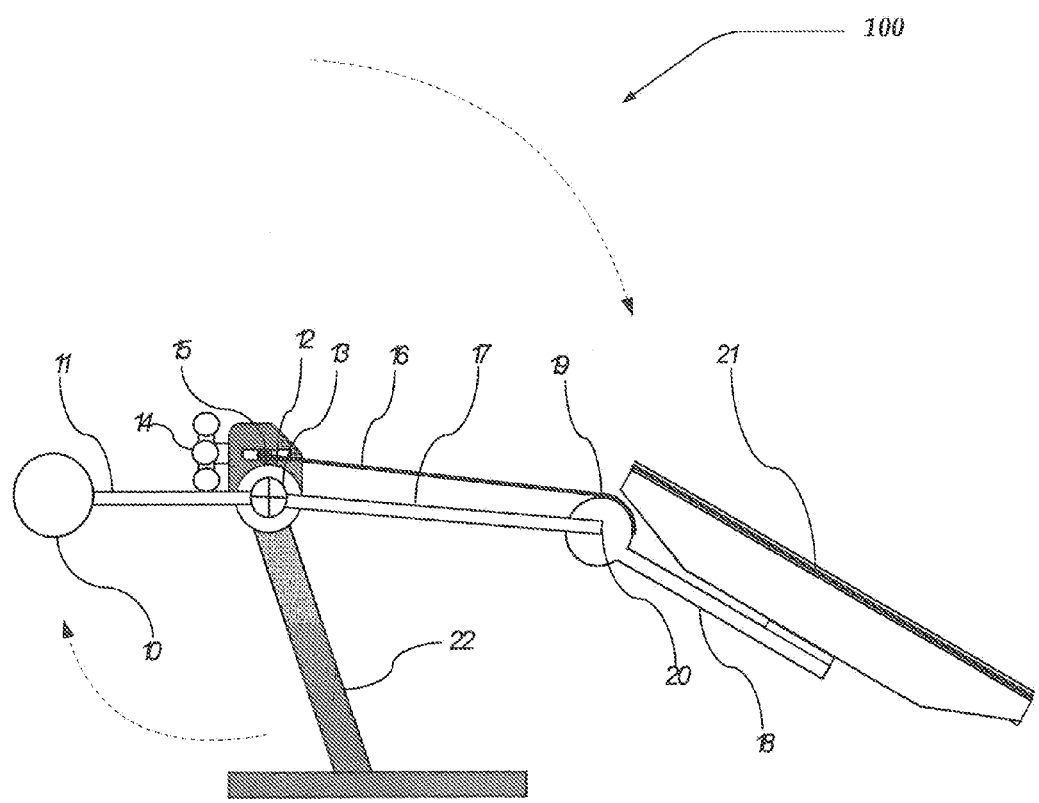
Figure 1C:
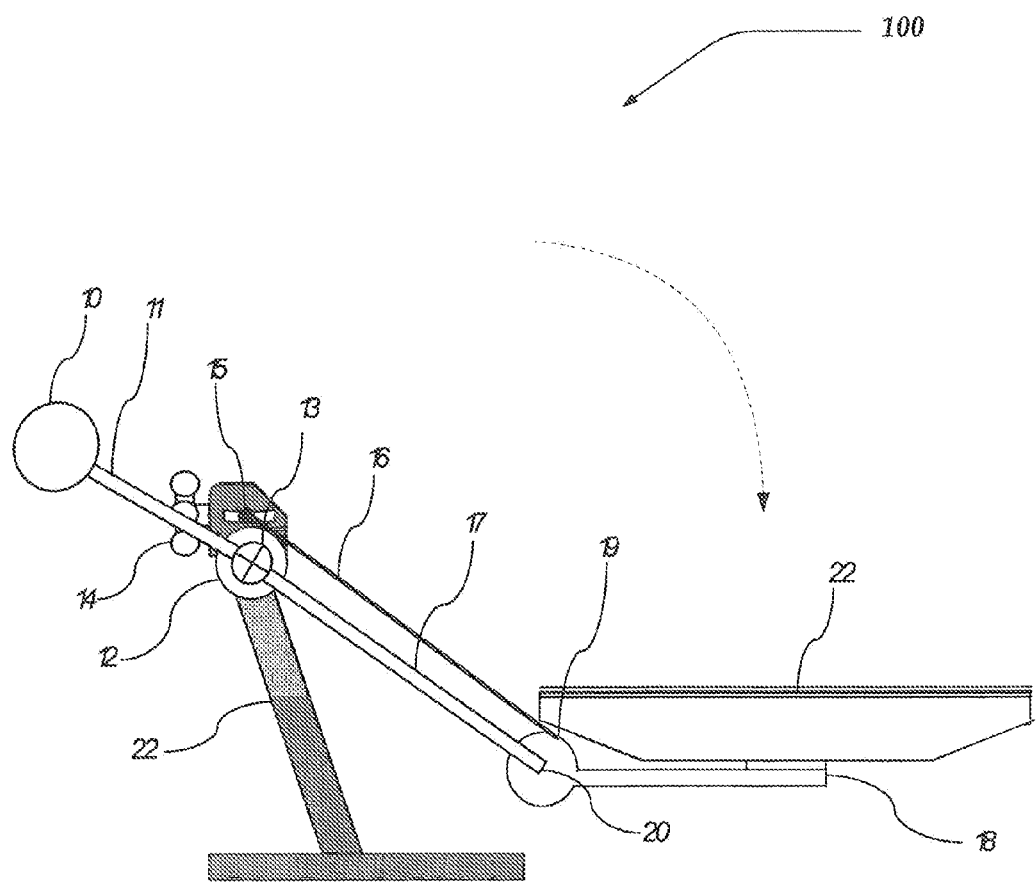

12—Holder for Torsion Spring
13—Fulcrum Between Counterweight Arm and Display Arm
14—Knob
15—Cable Attachment Point at Base
16—Cable
17—Display Arm
18—Display Mount (arm)
19—Tangent Point of Cable
20—Display Arm Pivot Point at one end of Display Mount (arm
21—Display
22—Base (computer monitor base)
22a—Bottom Portion of Base
22b—Elevated Support Member of Base 22
23—Spiral Cam
24—Cable between Cams
25—Arm Cam
30—Counterweight Pulley
31—Belt
32—Display in Vertical Position
33—Parallel Arm
34—Bracket
35—Shaft at Pivot Point
36—Display with Mass Centered around Pivot Point
37—Display Arm Pulley
38—Counterweight Shaped for Greater Outward Mass
39—Base Pivot Point of Parallel Arm
40—Counterweight Gear
41—Display Gear
42—Pivot Lock/Unlock Lever
43—Pivot Lock/Unlock Cam
44—Removable Tablet Display
45—Tablet Holder
46—Locking/Unlocking Pivot Point at Display Holder
47—External Cable Connecting Display Pivot Lock
48—Hollow Display Arm
49—Internal Cable Connecting Base Pivot Lock
50—Locking/Unlocking Pivot Point at Base Illustrative Embodiments FIGS. 1A-1C illustrate perspective views of one embodiment of a computer monitor base assembly having a counterweight with a computer display. As shown in FIG. 1A, apparatus 100 includes base 22 with elevated fulcrum point 13. Base 22 may comprise bottom portion 22a and elevated support member 22b. Bottom portion 22a is configured for placement of apparatus 100 onto a surface, such as a desk. Fulcrum point 13 is attached, to elevated support member 22b, which is arranged to elevate fulcrum point. 13 above bottom portion 22a.

Base 22 may be formed of virtually any materials, including, but not limited to plastic, metal, or the like. In one embodiment, elevated support member 22b and bottom portion 22a may be formed as a single unit, while in other embodiments, bottom portion 22a and elevated support member 22b may be configured as separable components, for shipping, storage, and/or other reasons. Moreover, in at least one embodiment, elevated support member 22b may be further configured as a telescopic component arranged to increase or decrease its height, to modify an overall height of base 22.

Fulcrum 13 may be rigidly attached to both counterweight arm 11 and display arm 17; such that both counterweight arm 11 and display arm 17 are pivotally connected to base 22 through fulcrum 13. Such pivotal connection is configured to allow counterweight arm 11 and display arm 17 to pivot around fulcrum 13. Counterweight arm 11 is further attached to at least one counterweight 10. Display arm 17 is pivotally coupled to display mount 18 at pivot point 20. Cable 16 connects to base 22 at a movable attachment point 15. In one embodiment, knob 14 is connected to movable attachment point 15 such that when knob 14 is turned clockwise or counterclockwise, attachment point 15 will be moved towards or away from knob 14 and outwards away from or inwards towards base 22. Cable 16 reaches the display mount 18 at tangent point 19. In one embodiment, cable 16 may be wrapped around and attached to one end of display mount 18, such that as display mount 18 rotates about pivot point 20, cable 16 'unwinds' and tangent point 19 moves closer towards the attachment point of cable 16 at the one end of display mount 18. A reverse rotation of display mount 18 similarly about pivot point 20 enables cable 16 to 'wind,' such that tangent point 19 moves further from the attachment point of cable 16 at the one end of display mount 18.

Display mount 18 further attaches to a back of a display 21 at a second end of display mount 18. In one embodiment, display mount 18 is implemented as a rotatable arm, configured to rotate about display arm pivot point 20. FIG. 1A illustrates one display arm 17, one counterweight arm 11, and one counter weight 10; however, other embodiments may employ multiple arms and/or multiple counterweights. Moreover, in another embodiment, a single counterweight 10 may be connected by multiple arms.

Display 21 can be virtually any computer monitor for providing an image to a user, including, but not limited to a liquid crystal display (LCD) device, or the like. In one embodiment, display 21 may be a computer display device that is configured as a touch screen display that enables users to interact and provide inputs to a computing system by touching a screen of the display 21. Display 21 may provide any of a variety of mechanisms for attaching to display mount 18, including, but not limited to bolts, screws, hooks, pin connectors, or the like. For example, in one embodiment a screw element may be employed to attach display 21 to display mount 18. By employing such mechanisms, display 21 may be removed from display mount 18 and/or other display devices may be attached to display mount 18. However, in other embodiments, display 21 may be attached to display mount 18 to not be readily removable. For example, in one embodiment, display 21 may be glued, soldered, welded, or otherwise permanently attached to display mount 18.

As further illustrated in FIG. 1A, torsion spring holder 12 contains a torsion spring (not shown) that attaches at one end of the torsion spring to display arm 17 and at the other end of the spring to base 22, such that a counter torque is imparted on display arm 17 when it is lowered as is described further below.

In one embodiment counterweight 10 may be made of cast iron. Cast iron is typically relatively inexpensive, heavy, non-toxic and durable. However, other embodiments may employ any of a variety of other materials for counterweight 10, including, but not limited to cast concrete, plate steal, lead or any other sufficiently dense material capable of withstanding light use and occasional accidental drops from a reasonable height, such as a desk, or the like.

By its nature, counterweight 10 is directed towards being sufficiently heavy to provide a counterweighing force to a weight of at least display 21, display mount 18, and display arm 17, to minimize a likelihood of apparatus 100 from tipping over when counterweight arm 11 and display arm 17 are pivotally rotated about fulcrum point 13. Therefore, counterweight 10 may add to a shipping cost of an embodiment.

Thus, in some embodiments, counterweight 10 may be constructed to incorporate local materials after shipping. For example, counterweight 10 could be a hollow container filled with powered hydrogel, cement or some other solidifying agent such that water, sand, or some other Weighty substance, is added as part of a user's assembly process.

In one embodiment, counterweight 10 and counterweight arm 11 may comprise a round cast iron ball attached to counterweight arm 11 using a threaded connection arrangement, where counterweight arm 11 has threading around at least one end for threading counterweight 10. In one embodiment, counterweight arm 11 may be configured as a steel rod. The use of a threaded connection allows the counterweight to move back and forth relative to one end of counterweight arm 11. This is useful for calibration of a balance between counterweight 10 and display 21. However, in another embodiment, counterweight 10 may be attached to the arm 11 via any of a variety of other methods, such as using two stoppers on either side of counterweight 10 to prevent the counterweight 10's movement along the length of counterweight arm 11. Any of a variety of other methods that allows the user to adjust counterweight 10's position moved along a length of counterweight arm 11 but held in a fixed position during normal use may also be employed.

Further, counterweight 10 may have any shape. For example, counterweight 10 may be a disc shape, ball shape, elongated shape, tubular shape, conic shaped, or the like. However, in at least one embodiment, selection of a shape might be made to have a center of mass for counterweight 10 as far away from the counterweight arm's fulcrum point 13 as possible. It is also possible to design a counterweight and arm as a combined unit such that it may be formed as a single object. For example, a counterweight and arm may be constructed of a single cast iron component. However, as noted elsewhere, other materials may also be used.

In other embodiments, the mass of the counterweight 10 may be adjusted by replacing the weight or adding/removing pieces to/from it. This feature is useful if display 21 is sold separately from the rest of the assembly and the user is required to calibrate the balance between a counterweight and display 21.

Illustrative Operations

The operation of certain aspects of the embodiments will now be described with respect to FIGS. 1A-1C. FIGS. 1A-1C illustrate perspective views of one embodiment of a base having a counterweight with a computer display in various angled positions. As illustrated, FIG. 1A displays a vertical position for the computer display; FIG. 1B illustrates a tilted horizontal position for the computer display 21, and FIG. 1C shows a flat horizontal position. It should be readily apparent to one of skill in the art that such illustrated positions are non-limiting, and other positions may be obtained when the computer display is rotated about the base, as described further below.

In any event, when display 21 is in a vertical position, FIG. 1A, display 21 is in its highest elevation, and counterweight 10 is below display 21, and is at its lowest elevation. As used herein, the term "vertical," with respect to display 21 refers to a screen viewing face of display 21 that is used to display images or other content, being vertical or approximately vertical within a few degrees of tolerance from a 90 degrees position with respect to a desk, or other surface upon which base 22 with display 21 is placed. Again, FIG. 1A illustrates one embodiment of such vertical configuration.

As shown in FIGS. 1B-1C, as display arm 17 is lowered (see dashed arrow indicating direction of movement), such as being repositioned downwards towards a resting surface like a desk or the like, counterweight arm 11 is reciprocally raised because of a rigid connection between counterweight arm 11 and display arm 17. In addition, as display arm 17 is lowered, the cable attachment point 15 is positioned such that a length between attachment point 15 and a tangent point 19 will increase. In one embodiment, this may result from a rotation of display mount 18 about display arm pivot point 15. This will impart a torque on display mount 18, forcing display mount 18 to rotate around display pivot point 20 and to tilt display mount 18 away from base 22, such as illustrated in non-limiting FIG. 1B. As shown, tangent point 19 then is repositioned closed to an attachment point on display mount 18 as cable 16 'unwinds' from the one end of display mount 18.

Both the display assembly's mass (e.g., a sum of masses of at least display 21, display arm 17, and display mount 18) and the counterweight assembly's mass (including masses of at least counterweight 10 and counterweight arm 11) generate opposing torques at the fulcrum 13 that are directed towards minimizing the assembly's likelihood of becoming unbalanced, and thereby toppling over In one embodiment, the center of mass of the apparatus 100 is maintained in substantially a same position over base 22 throughout the pivotal rotation of counterweight arm 17 and display arm 18. By minimizing the center of mass for apparatus 100 from being relocated by a substantial amount, the likelihood of apparatus 100 becoming unbalanced and thereby toppling is also minimized. As used herein, the phrase "substantially the same" refers to an amount of movement of the center of mass about an initial position with respect to a location over base 22 by value that is unlikely to result in apparatus 100 toppling.

Figure 2:
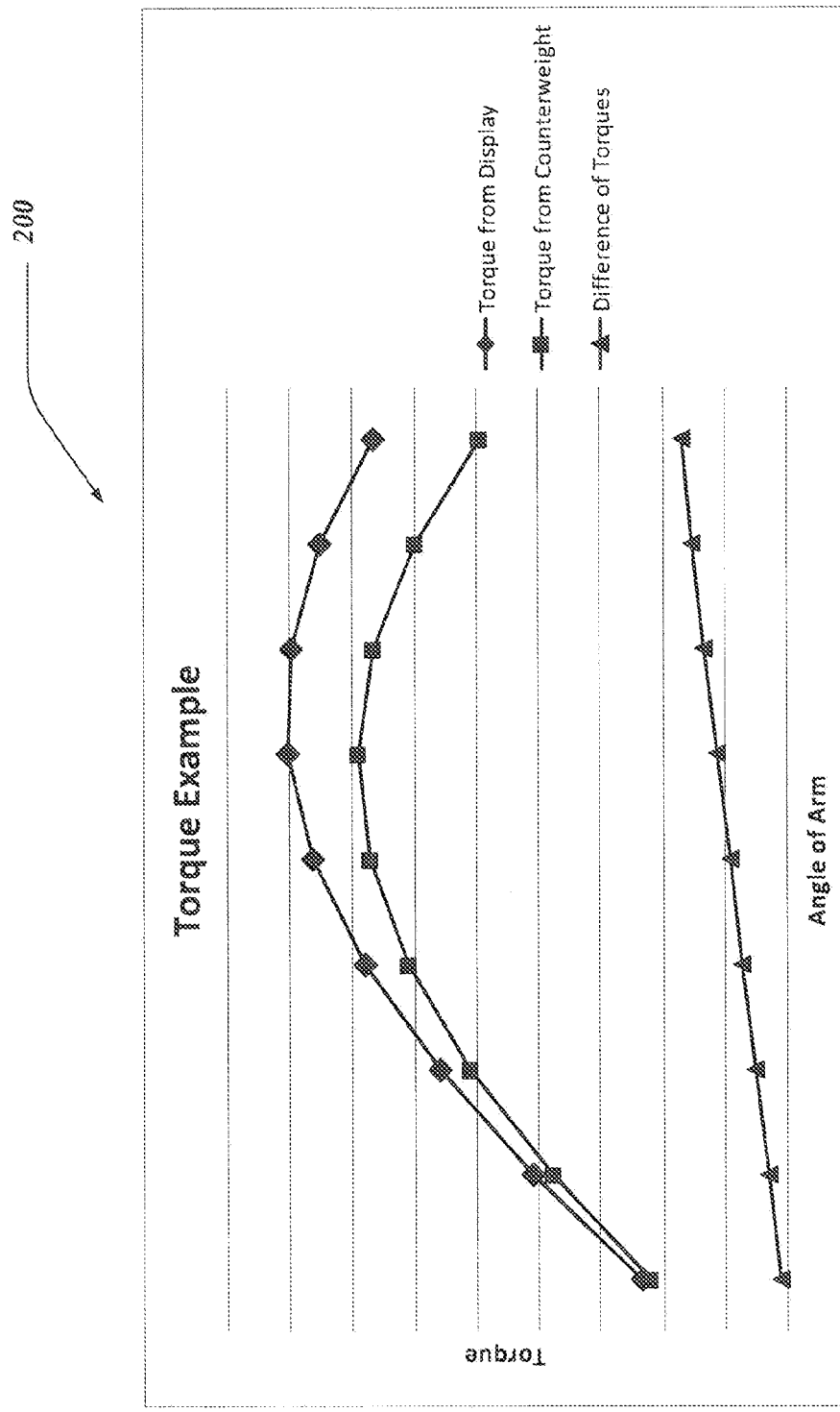
FIG. 2 illustrates one non-limiting, non-exhaustive example of a graph of opposing torques at a fulcrum.

The opposing torques may be directly related to a center of mass between at least display 21 and counterweight 10. When the torque of the display assembly is not matched by the torque of the counterweight assembly, it represents a movement of the apparatus 100's center of mass. FIG. 2 provides one non-limiting, non-exhaustive example of a graph 200 of opposing torques at a fulcrum 13 to assist in illustrating this aspect. A left hand side of the graph 200 represents display 21 in a vertical position (as shown in FIG. 1A). The right hand side of the graph 200 represents display 21 in a flat horizontal position (as shown in FIG. 1C). Counterweight 10 is selected such that its mass directly opposes a display's mass when in the vertical position, such as shown in FIG. 1A. As display arm 17 pivots down from vertical position (FIG. 1A), display 21 and display mount 18 are tilted outwards from base 22. This generates an additional torque that might not be compensated for by counterweight 10. Thus, the apparatus 100's center of mass moves towards a direction that display 21 is tilted. However, most of the display 21's mass may be compensated for by counterweight 10. By providing such compensation a footing size for (e.g., footprint or area covered by) base 22 can be reduced without an anticipated danger of base 22 toppling when the display 21 is lowered. In one embodiment, the additional torque generated as display mount 18 is tilted outwards from base 22 and that is not compensated for by counterweight 10 may be compensated for by use of a torsion spring (not shown) within holder 12. The torsion spring will provide an upward force on display arm 17 such that display 21 will not drop because of the uncompensated force from the display 21 tilting outwards.

In one embodiment, pivots points 13 and 20 for display arm 17 may be constructed as detent hinge arrangements, frictional hinge arrangements, or any other form of hinges that add a restrictive force to limit display 21's moment when a desired pivot point limit of display arm 17 is reached.

The following non-limiting sample equations are provided to further aid in understanding various design and construction aspects of the counterweight 10 and counterweight arm 11, given known parameters for various display side components. In one embodiment, a torque of the display assembly may be calculated by finding a center of mass per each display side elements (e.g., such as display arm 17, display mount 18, display 21) then calculating each element's contribution to a total torque at the fulcrum 13. One possible equation for finding the torque contribution of the display arm 17 per given angle of pivot is:

> Torque Display Arm=length to center of mass of display arm*mass of display arm*COSINE(pivot angle of display arm)

Calculating the torque contribution of display 21 and display mount 18 may include accounting for two angles, an angle of display arm 17 and an angle of display mount 18 tilt. In one embodiment, this may be obtained by calculating a combined center of mass for both the display 21 and the display mount 18 then applying the equation:

> Torque Display and Holder=length of display arm+ (COSINE(tilt angle of display holder)*length to center of mass of display and holder)*mass of display and holder*COSINE(pivot angle of display arm)

One possible equation for finding the total torque contributed by the display assembly at the fulcrum 13 is:

> Torque Display Assembly=Torque Display and Holder+Torque Display Arm

Once the display assembly torque is determined, the counterweight 10 and counterweight arm 11 can be chosen to counter this torque and keep the center of mass for the total assembly over the display base 22. The additional torque generated from the display mount 18 tilting outward as the display arm 17 lowers is nonlinear but can be approximated, in one embodiment, by placement of a torsion spring in holder 12.

Alternative Embodiments

Figure 3:
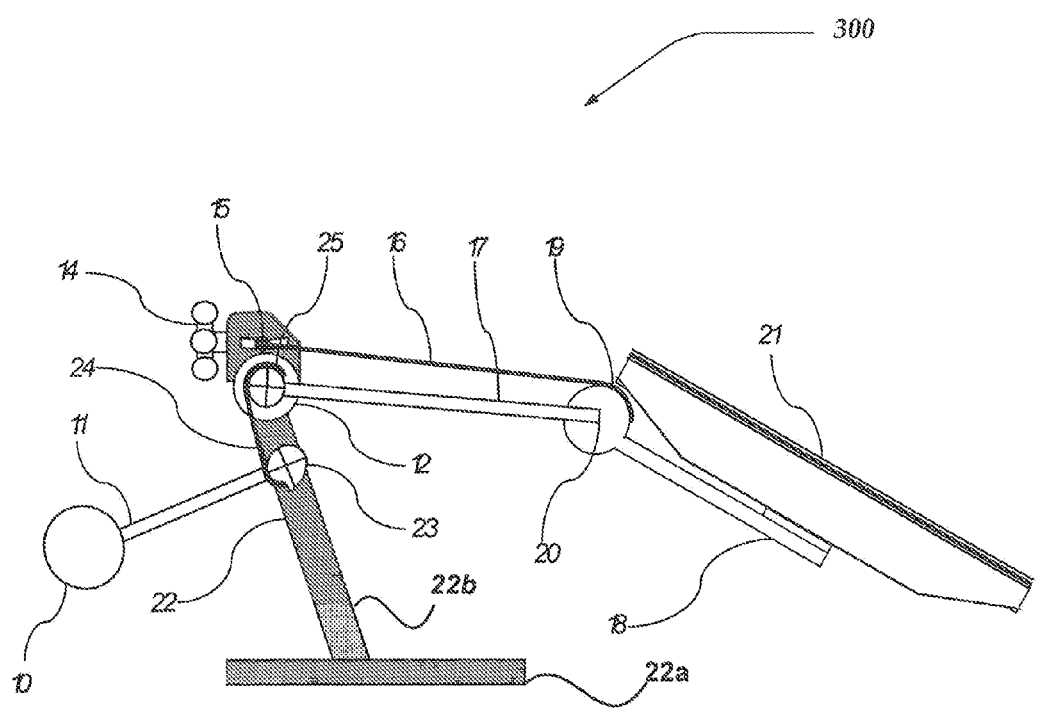
FIG. 3 illustrates another embodiment of a perspective view of a base having a mounted computer display indirectly coupled to a counterweight using, non-linear cams.

Other embodiments are also envisaged. For example, FIG. 3 illustrates one embodiment of a perspective view of a base having a mounted computer display indirectly coupled to a counterweight using non-linear cams. Apparatus 300 of FIG. 3 shows a similar arrangement to FIGS. 1A-1C; however, in apparatus 300, counterweight arm 11 is indirectly coupled to the display arm 17 via a cable 24. In one embodiment, the cable 24 is made of a vinyl material, covered with steel, with a uniform helical arrangement of wires concentrically stranded together. However, in other embodiments, synthetic fiber monofilament, synthetic fiber braided, metal chain, or any other flexible member can be used, provided that such materials provide a minimum amount of elasticity relative to its length. Display arm 17 is rigidly attached to circular arm cam 25, which is wrapped by cable 24. Counterweight arm 11 is rigidly attached to spiral cam 23 and wrapped by cable 24 to form a rigidly coupled arrangement between spiral cam 23 and circular arm cam 25. In one embodiment, spiral cam 23 is non-circular, and instead may include a cam-out, or detent shape. Both spiral cam 23 and circular arm cam 25 are attached to elevated support member 22*b* in a manner that allows the cams to rotate about their respective attachment points on elevated support member 22*b*.

In apparatus 300, when display arm 17 pivots downward, counterweight arm 11 is pulled upward due to the rigidly coupled arrangement from the cable 24 connection. Because spiral cam 23 is non-circular, spiral cam 23 imparts a nonlinear counter force relative to a force of a rigidly connected counterweight arm 11 to display arm 17 as shown on FIGS. 1A-1C. Thus, in apparatus 300, counterweight arm 11 is directed towards rotating at a different rate than display arm 17. This allows spiral cam 23 to be designed such that counterweight 10 will equally oppose the additional torque generated from display 21 tilting outward away from base 22. The center of mass for the assembly is directed towards remaining constant, and over base 22, as display mount 18 tilts display 21 away from base 22.

In one embodiment, spiral cam 23 is non-circular; however, in other embodiments, arm cam 25 could also be non-circular or both cams could be non-circular, thereby enabling various designs to regulate different rates of rotations between the arms.

Figure 4:
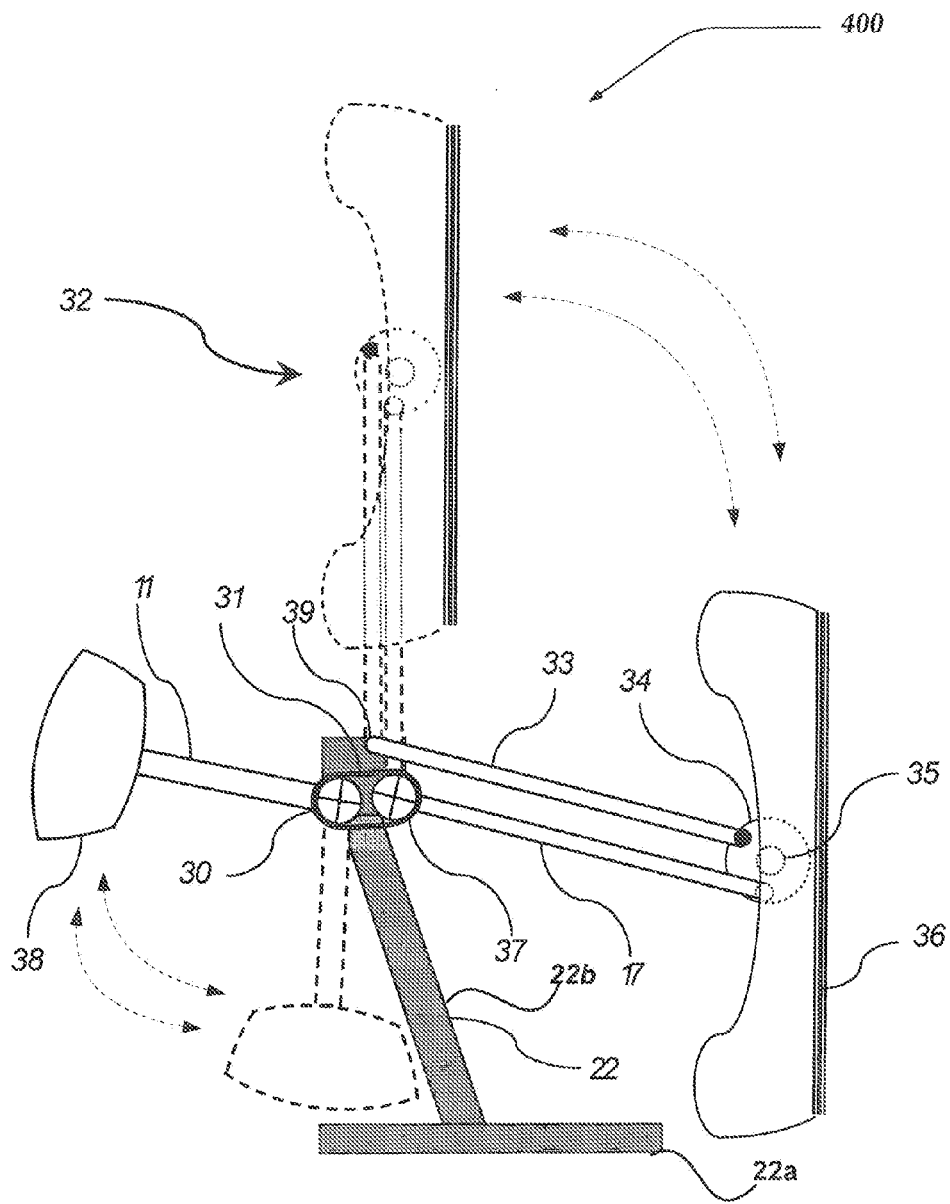
FIG. 4 illustrates another embodiment of a perspective view of a base having a mounted computer display indirectly coupled to a counterweight having a pulley/belt mechanism.

FIG. 4 illustrates another alternate embodiment of a perspective view of a base having a mounted computer display indirectly coupled to a counterweight having a pulley/belt mechanism. Apparatus 400 of FIG. 4 shows a similar base 22 as previous embodiments however, the counterweight arm 11 and display arm 17 are coupled via a pulley and belt system. The pulley and belt system allows the counterweight arm pivot location to be independent of the display arm pivot location, each pivot location being separately attached to elevated support member 22*b* to allow the arms to rotate or pivot about their respective pivot locations.

As shown, counterweight 38 may be shaped to maximize its mass opposite to the counterweight arm's pivot point at counterweight pulley 30. Counterweight pulley 30 is coupled to display arm pulley 37 by belt 31. Alternately, the pulleys and belt could be replaced by cogs and chain. Display arm 17 is pivotally connected to bracket 34. Bracket 34 may be shaped to allow display 36 to rotate around bracket 34. A second, parallel arm 33 is also pivotally connected to bracket 34. Parallel arm 33 connects to base 22 at pivot point 39. Bracket 34 is further attached to display 36 by shaft 35. Shaft 35 may be a member of a detent hinge, a frictional hinge or any other form of hinge arrangement that adds a restrictive force to limit display 36's moment when at a desired tilt. Display 36 is constructed to have its center of mass located at the center of shaft 35.

When display arm pulley 17 pivots, display arm pulley 37 is rotated. This drives belt 31, which in turn rotates counterweight pulley 30 and pivots counterweight arm. 11. Counterweight 38 and counterweight arm 11 are designed to counterbalance the display assembly as it pivots and to maintain the center of mass over the display base 22.

Display 36's tilt angle is not intended to affect the torque at display arm pulley 37 because the display 36's center of mass is constant relative to its angle of tilt. Therefore, display 36's tilt angle is not intended to affect the center of mass between counterweight 38 and display 36.

Parallel arm 33 and display arm 17 are directed towards keeping bracket 34 at a constant tilt relative to base 22 for display arm 17's pivot area. In this embodiment, the pivot area of display arm 17 includes the arc of swing between the vertical position 32 and the point where display arm 17 contacts base 22.

Display arm pulley 37 may be constructed as member of a detent hinge, a frictional hinge or any other form of hinge that adds a restrictive force to limit pivot of display arm 17's moment when at a desired location.

Figure 5:
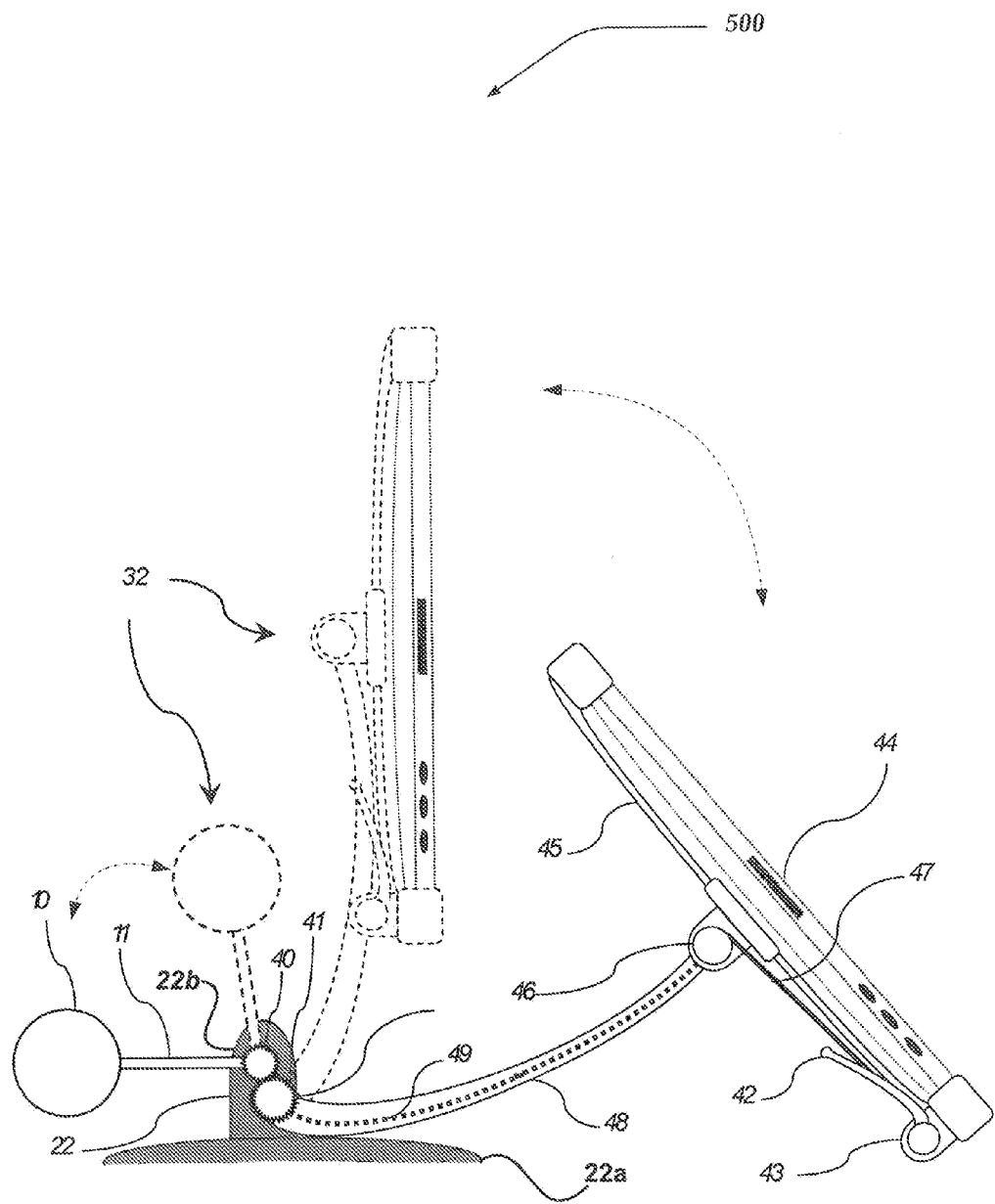
FIG. 5 illustrates another embodiment of a perspective view of a base having a mounted computer display indirectly coupled to a counterweight having a gear mechanism.

FIG. 5 illustrates another embodiment of a perspective view of a base having a mounted computer display indirectly coupled to a counterweight having a gear mechanism. Apparatus 500 of FIG. 5 shows base 22 where counterweight 10 and a display tablet 44 are both elevated when the display tablet 44 is in vertical position 32. As display tablet 44 is lowered, counterweight 10 also lowers in a reciprocal manner.

Counterweight arm 11 is rigidly connected to counterweight gear 40. Display arm 48 is rigidly connected to display gear 41. Counterweight gear 40 meshes with display gear 41 such that they will counter-rotate together. In one embodiment, display tablet 44 is a detachable computer display tablet that may be coupled to display arm 48 through display holder 45. Lever 42 attaches to cam 43. Cam 43 attaches to cable 47 such that when lever 42 is pressed toward display holder 45 the cable 47 is pulled. Cable 47 also attaches to locking pivot point 46 at display holder 45. Cable 49 attaches to locking pivot point 46 such that when locking point 46 is unlocked cable 49 will be pulled. Cable 49 may, in one embodiment, run inside display arm 48 and attach to locking pivot point 50 at base 22 such that when cable 49 is pulled, locking point 50 will unlock.

When display arm 48 pivots, display arm 48 rotates display gear 41, which in turn will cause counterweight gear 40 to rotate in an opposite direction. Thus, the gears (40 and 41) will cause counterweight 10 to lower towards a horizontal position when display holder 45 lowers, and will rise towards a vertical position when display holder 45 rises. This keeps the center of mass of the display and counterweight assemblies over base 22.

For apparatus 500, it is intended that a user grip between tablet 44 and lever 42 when adjusting tablet 44's position. This presses lever 42 to unlock the pivot points 46 and 50 to allow for easy adjustment. When the user has adjusted tablet 44 to a desired position, the grasp may be released and pivot points 46 and 50 to lock their pivot positions.

When display holder 45 is titled, it affects the torque at display gear 41. The tilt of display holder 45 is controlled by a user's preference thus, this creates a variable torque for any point in the display arm's 48 arc of swing. The counterweight 10 may not perfectly match this variable torque, as it is dependent on user preference. Thus, the counterweight assembly should be designed to closely approximate the counter torque required to balance the display assembly. The gear ratios between the display gear 41 and the counterweight gear 40 need not match because they may merely approximate the opposing torques.

As disclosed above, various embodiments are directed towards providing useful mechanisms for using a counterweight to keep the center of mass between a counterweight and display and over the base of the display, thereby allowing for a smaller display base footprint than might otherwise be required. Further, various embodiments provide a useful mechanism for indirectly coupling the counterweight arm with the display arm. While the specific embodiments contain many methods of coupling the display arm to a counterweight arm they each share at least one common theme—that the display is pivotally connected to a base by at least one arm, at least one counterweight is pivotally connected to the base, when the display arm pivots the counterweight also pivots to keep the center of mass of the display and counterweight over the base.

It is possible to combine different features of the embodiments to create yet additional embodiments to suit a given need. For example, by combing a nonlinear cam of FIG. 3 with pulley and belt shapes of FIG. 4 it's possible to generate non-circular pulleys to generate an irregular counterweight torque. Another possible embodiment is to have a wall-mounted base where the counterweight and arm hangs low as the display and its arm is high. The display and counterweight could be coupled by a gear mechanism similar to FIG. 5. When the display is lowered and pivoted away from the wall the counterweight would be raised and tilted away from the wall. In this design, the center of mass is not kept over the base but this may be unnecessary because a wall mounting would provide a fixed connection.

The above specification, examples, and data provide a complete description of the manufacture and use of the composition various embodiments. Since many embodiments of the invention can be made without departing from the spirit and scope of the invention, the invention resides in the claims hereinafter appended.

What is claimed as new and desired to be protected by Letters Patent of the United States is:

1. An apparatus usable to support a computer display device, the apparatus comprising:
   a base having a bottom portion and an attached elevated support member;
   a display arm having a first end that is pivotally connected to the elevated support member;
   a counterweight arm that is separate and distinct from the display arm and having a first end that is pivotally connected to the elevated support member at a different location from where the display arm is pivotally connected to the elevated support member so that when the display arm is pivoted about the base, the counterweight arm pivots about the base to counterbalance a mass associated with at least the display arm thereby maintaining a center of mass of the apparatus over the base and minimizing a likelihood that the apparatus becomes unbalanced;
   a cam assembly that includes a first cam and a second cam, each cam being attached to the elevated support member at the different locations along the elevated support member, the first cam being further attached to the first end of the display arm, and the second cam being further attached to the first end of the counterweight arm; and
   a cable that is wrapped around the first cam and the second cam such that the counterweight arm and the display arm are indirectly coupled through the cam assembly and cable, such that a pivotal rotation of the display arm causes the counterweight arm to also pivotally rotate.

2. The apparatus of claim 1, further comprising:
   a display mount arm having a first end that being pivotally coupled to the display arm at a second end of the display arm, and a second end that is rigidly coupled to the computer display device.

3. The apparatus of claim 1, wherein at least one of the first cam or the second cam is non-circular.

4. A support structure, comprising:
   a computer display device;
   a base having a bottom portion and an attached elevated support member;
   a display arm having a first end that is pivotally connected to the elevated support member and a second end that is coupled to the computer display device; and
   a counterweight arm that is separate and distinct from the display arm and having a first end that is pivotally connected to the elevated support member at a different location from the location of the display arm and in a manner that when the display arm is pivoted about the base, the counterweight arm pivots about the base to counterbalance a mass associated with at least the display arm and the computer display device to maintain a center of mass of the apparatus over the base and to minimize a likelihood that the apparatus becomes unbalanced;

a cam assembly that includes a first cam and a second cam, each cam being attached to the elevated support member, the first cam being further attached to the first end of the display arm, and the second cam being further attached to the first end of the counterweight arm; and a cable that is wrapped around the first cam and the second cam such that the counterweight arm and the display arm are indirectly coupled through the cam assembly and cable, such that a pivotal rotation of the display arm causes the counterweight arm to also pivotally rotate.

5. The support structure of claim 4, wherein the counterweight arm includes a weight attached to a second end of the counterweight arm, wherein the weight is configured to move along the counterweight arm using threads.

6. The support structure of claim 4, wherein the computer display device is configured to be removable from the display arm.

7. The support structure of claim 4, further comprising:

a display mount arm having a first end that being pivotally coupled to the display arm at a second end of the display arm, and a second end that is rigidly coupled to the computer display device.

8. The support structure of claim 4, wherein at least one of the first cam or the second cam is non-circular, having at least one detent.

\* \* \* \* \*